United States Patent
Wood

[15] 3,637,023
[45] Jan. 25, 1972

[54] METHOD OF HARVESTING PEANUTS

[72] Inventor: George C. Wood, P.O. Box 448, Edenton, N.C. 27932

[22] Filed: Aug. 28, 1970

[21] Appl. No.: 68,011

Related U.S. Application Data

[63] Continuation of Ser. No. 751,722, Aug. 12, 1968, abandoned.

[52] U.S. Cl. ........................................171/1, 171/61, 47/58
[51] Int. Cl. ......................................................A01d 29/00
[58] Field of Search ...........................171/1, 61; 56/1; 47/58

[56] References Cited

UNITED STATES PATENTS

| 3,024,849 | 3/1962 | Gregory | 171/61 |
| 3,059,703 | 10/1962 | Pearman | 171/61 |
| 3,241,619 | 3/1966 | Morrow | 171/61 |

*Primary Examiner*—Antonio F. Guida
*Attorney*—Munson H. Lane

[57] ABSTRACT

The peanut vines with the peanuts adhering thereto are first dug and deposited with their vines or a portion of them buried in the ground and the peanuts extending upwardly therefrom so that they may be accessible for harvesting either by hand or by machinery after several days. In this manner the familiar flavor of the peanuts is retained and the development of mold or other injurious organism is prevented or deterred.

7 Claims, No Drawings

METHOD OF HARVESTING PEANUTS

This application is a continuation of application, Ser. No. 751,722, filed Aug. 12, 1968, now abandoned.

This invention relates to an improved step in the method of harvesting peanuts or the like. For many years it has been the custom in harvesting peanuts to leave the peanuts on the vine in stacks after digging for a considerable period of time before removing the peanuts from the vines. In more recent years the stacking of the vines has been eliminated and the vines and the peanuts were dug and separated in a continuous operation for prompt drying. This procedure was found to produce an undesirable metallic flavor in the peanuts when finally harvested and roasted. In order to avoid this undesirable result it was proposed to leave the plants on top of the ground with the peanuts on the vines for a few days after digging. The moisture of the ground slows drying. When rained upon some of the nuts adhere to the soil and are pulled from the plant and lost by the fingers of the harvester lifting the vines at harvest. Winds entangle, bunch and misalign the windrows, increasing harvest difficulties, and moist warm bunches encourage mold or other organisms which may be injurious to health. As the next improvement peanuts were dug and placed on the ground with their vines down and nuts up in the air to permit drying and in a position for subsequent removal from the vines in a known manner either by hand or by machinery. Such digging and removal of the vines and the peanuts may be done by machinery as is shown, for example, in the U.S. Pat. to Wilbur Wallace, No. 3,181,617, dated May 4, 1965. FIG. 6 of this patent diagrammatically illustrates the reversing operation.

It has been found, however, that while the operation described above prevents the metallic flavor from occurring most of the previously pointed out adverse conditions still exist, but to a lesser degree from such procedure.

It is the object of the present invention to increase harvesting efficiency and to prevent the conditions which encourage molding of the nuts while at the same time improving taste by retaining the peanuts on the vines for a considerable time, which may vary according to local conditions for a few days, that is 2 or more, to a few weeks, that is to say 2 to 3 weeks.

In accordance with my invention the vines, after they have been removed from the ground by any suitable means, are reversed and the vines at least partially buried in the ground with the peanuts projecting upwardly into the air to permit drying while at the same time permitting the peanuts to draw the desirable qualities from the vines during the period of curing, that is to say during the time while the peanuts remain attached to the vines. Additionally nut and vine separation at harvest time is aided by permitting the nuts to be plucked or slapped from the vines rather than mixed together and then separated by air and weight difference.

This reverse planted condition is maintained for a considerable period of time as indicated above, 5 days being found suitable in many instances in the North Carolina area around Edenton and elsewhere.

During this period the peanuts are cured and derive desirable constituents from the vines before being removed by any suitable means, as by hand or by machine, after which they may be treated in a well-known manner, including roasting and the like, as will be apparent to those skilled in the art.

The replacing of the vines in the ground may be accomplished either by hand or by machine. A suitable excavation or trench is provided into which the vines are inserted and at least partially covered with earth to a suitable depth, leaving the peanuts projecting upwardly on the stemmy portion of the vines. The depth should be sufficient to prevent the vines from being blown away by the wind and shallow enough to elevate the nuts out of ground contact. Desirably about one-half of the vine is covered, this being sufficient to hold the vine in place though the depth of earth may be varied considerably within the scope of my invention. It has been found that when the peanut plant is kept under control as described the tendency to mold is decreased while the flavor of the peanuts after eventual removal from the vine and roasting is found to be enhanced by means of the fact that the peanuts remain in contact with the healthy vine for a considerable period of time before removal.

After the elapse of a suitable period of time which may be about 5 days in the Edenton, N.C. area, the exact time depending upon the weather, the peanuts themselves are readily removed from the vines either by hand or by machinery as is well known in the art, and may thereafter be treated by the usual steps including eventual roasting of the peanuts to be eaten, at which time the peanuts are found to have a flavor equal to or better than that of peanuts harvested in the old-fashioned manner including stacking of the vines with the peanuts thereon and subsequent removal of the peanuts. Of course, when the peanuts are to be used raw, as for example for planting, the roasting step is omitted. In either event the formation of mold or the like is avoided or diminished, thus improving the value of the peanut crop.

What is claimed is:

1. In a method of treating peanuts which includes the steps of initially digging the peanuts without separation from the vines, inverting the peanuts and vines so that the peanuts extend upwardly from the vines and subsequently separating the peanuts from the vines; the improvement which comprises the step of at least partially burying the vines in the ground after digging, leaving the peanuts adhering to the vines and projecting upwardly into the air for drying for several days while continuing to draw nutriment form the vines, prior to separation of the peanuts from the vines.

2. The step as defined in claim 1 wherein the vines are buried from about 2 days to 3 weeks after digging and before removal of the peanuts.

3. The step as defined in claim 1 wherein the vines are buried for about 5 days after digging and before removal of the peanuts.

4. A method of treating peanuts which comprises digging the peanuts without separation from the vines, inverting the vines and peanuts, then burying the vines in the ground as defined in claim 1, and thereafter separating the peanuts from the vines.

5. A method of treating peanuts which comprises digging the peanuts without separation from the vines, inverting the vines and peanuts, then burying the vines in the ground as defined in claim 1, and thereafter separating the peanuts from the vines and subsequently roasting the peanuts.

6. The method according to claim 5 wherein the vines are buried from about 2 days to 3 weeks after digging and before removal of the peanuts.

7. The method according to claim 5 wherein the vines are buried for about 5 days after digging and before removal of the peanuts.

* * * * *